Oct. 15, 1968 W. H. SHAW 3,406,261
TELEPHONE SWITCHBOARD CALL TRANSFER DEVICE
Filed March 19, 1965
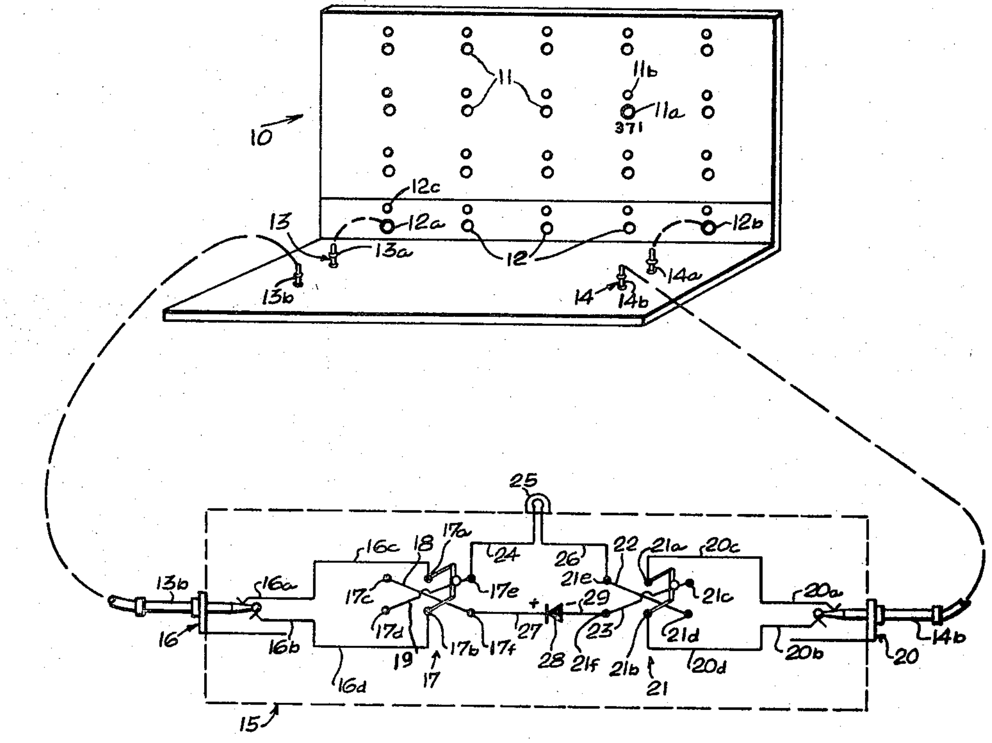
INVENTOR.
WALTER H. SHAW
BY Ernest H. Schmidt
ATTORNEY.

3,406,261
TELEPHONE SWITCHBOARD CALL TRANSFER DEVICE
Walter H. Shaw, 20 SE. 3rd Ave., Miami, Fla. 33131
Filed Mar. 19, 1965, Ser. No. 441,086
2 Claims. (Cl. 179—42)

ABSTRACT OF THE DISCLOSURE

A telephone switchboard call transfer device for rerouting incoming calls at a subscriber switchboard through an outgoing trunk line. A patch circuit is used, including polarity reversal switches connected with the respective incoming and outgoing lines for establishing correct polarity of inter-connection through the device, indicated by lighting of a supervisory lamp in a series network with a rectifier in the patch circuit. The supervisory lamp thus serves both as an indication of correct polarity to be achieved by the operator by use of the switches, and as supervision of the rerouting circuits so that disconnect can be made upon completion of a rerouted call.

My invention relates to telephone circuitry and is directed particularly to a telephone call transfer device for use in rerouting incoming calls at a subscriber switchboard and local telephone system through an outgoing trunk to any remote station to complete the call in instances when the person called at a local station of the switchboard system has informed the switchboard operator that he can be reached by telephone at a particular remote subscriber station.

In the completion of incoming calls to a particular telephone station associated with a local switchboard, system operation is such that a supervisory lamp associated with the incoming call trunk line lights, signalling the switchboard operator to plug in the trunk or front end of a loop cord enabling her to receive the call through her headset by operation of an associated key switch. Upon being given the name or number of the local system telephone or station being called, such as a particular room in a hotel, the operator plugs the back or station plug at the other end of the loop cord into the particular jack in the switchboard corresponding to the telephone being called, rings the called telephone, and waits for it to be answered, as evidenced by the supervisory lamp associated with the local station jack going out. When the call is terminated at either end by replacement of a handset on its cradle, the associated supervisory lamps will again light to so inform the operator, whereupon she will withdraw the loop cord plugs to disconnect the established talking circuit or loop and thereby return the equipment to normal or standby conditions again.

It will be apparent from the foregoing that the operation of the supervisory lamps associated with the trunk line and the local telephone station serve to inform the operator at all times as to the use status of the telephone circuits involved in a telephone call. The supervisory lamps thus enable the operator to monitor an established talking circuit so that she can disconnect at the termination of the call without the need of switching in and listening, a practice forbidden by telephone regulations.

Heretofore, it has been impossible in a standard switchboard to transfer or reroute a trunk line incoming call at a subscriber switchboard to a remote station through an outgoing trunk line by use of a loop cord because of the lack of a supervisory lamp associated with the outgoing call and because any attempt to establish such a loop or transfer would result in the two foreign batteries associated with the incoming and outgoing trunk lines being connected in opposition, a condition rendering such an attempted talking circuit inoperative.

It is accordingly the principal object of my invention to provide a telephone switchboard call transfer device which will permit the transfer or rerouting of a trunk line incoming call through an outgoing trunk line at the switchboard while maintaining supervision of a call thus completed by the switchboard operator by means of a supervisory lamp associated with the call transfer device.

It is another object of the invention to provide a call transfer device of the character described which will correct polarity of the two mutually foreign batteries associated with the talking circuit of incoming and outgoing trunk lines at a subscriber switchboard.

Still another object of the invention is to provide a call transfer device of the above nature which is compact and self-contained, and which is comprised of a minimum number of parts, all of which are devoid of moving parts and long lasting in use.

Other objects, features and advantages of the invention will be apparent from the following description when read with reference to the accompanying drawings, the single figure of which illustrates, schematically, a telephone switchboard call transfer device embodying the invention and a switchboard in association with which the device is being used.

Referring now in detail to the drawing, 10 designates, generally and in simplified form, a manual switchboard at a subscriber station, said switchboard having a plurality of local station jacks 11, **11*a*, one for each telephone in the local system associated with the switchboard, a plurality of trunk line jacks 12, 12*a*, 12*b* for incoming and outgoing calls, and a plurality of cord loops 13, 14 (only two shown) each of which has front and back plugs 13*a*, 13*b*, and 14*a*, 14*b*, respectively. In ordinary operation, an incoming call on a particular trunk, say trunk line 12*a*, will be indicated by the lighting of the associated trunk line lamp 12*c* informing the operator to plug in the front plug of an unused cord loop, for example cord loop 13, to receive the call. If the call is to local telephone station 371 of the switchboard system, for example, she will then plug the back plug 13*b* into the corresponding jack 11*a* of that local telephone station being called, at which time the associated jack lamp 11*b* will light, and ring the telephone by means of a key switch (not illustrated) associated with the cord loop being used. When the called person picks up his handset, the jack lamp 11*b*** will go out and remain out until he has replaced the handset at the termination of the call, at which time it flashes on again to indicate that the call has been terminated and that the cord loop being used can be unplugged to return the equipment to standby, ready for use in the completion of other calls.

If the person being called on an incoming trunk line cannot be reached at a local station, and has left word to transfer his calls to a remote station through an outgoing trunk line, this can be effected by use of the telephone switchboard call transfer device embodying the invention, generally designated by reference numeral 15 and now to be described in detail.

The call transfer device 15 comprises a front jack 16 having a ring contact arm **16*a* and a tip contact arm 16*b*, which contact arms are connected, respectively, to the movable contact members 17*a*, 17*b*, respectively, of a double-pole, double-throw switch 17 by conductors 16*c* and 16*d*. The switch 17 comprises a first pair of fixed contact members 17*c*, 17*d* at one side, and a second pair of fixed contact members 17*e*, 17*f* at the other side, which contact pairs are cross-connected by conductors 18 and 19**.

The call transfer device further comprises a back jack 20 having a ring contact arm **20*a* and a tip contact arm 20*b*, which contact arms are connected, respectively, to the movable contact members 21***a*, 21*b* of a double-pole, double-throw switch 21 by conductors 20*c* and 20*d*. The switch 21 comprises a first pair of fixed contact members 21*c*, 21*d* at one side, and a second pair of fixed contact members 21*e*, 21*f* at the other side, which contact pairs are cross-connected by conductors 22 and 23. Fixed contact arm 17*e* of switch 17 is connected as by conductor 24 to one terminal of a supervisory lamp 25, the other terminal thereof being connected, as by conductor 26, to fixed contact arm 21*e* of switch 19. Fixed contact arm 17*f* of switch 17 is connected as by conductor 27 to the positive terminal of a diode rectifier 28 the negative terminal of said diode being connected, as by conductor 29, to fixed contact arm 21*f* of switch 21.

Switches 17 and 21 are line reversal switches for polarity correction of either the incoming trunk line, the outgoing trunk line, or both, as may be necessary, depending upon the polarity connection of the mutually foreign batteries associated with the trunk lines.

In rerouting a call with the use of the call transfer device, the operator will plug the front plug 13*a* of any cord loop 13 into the incoming call trunk jack, jack 12 for example, as indicated by the broken line representation of such connection in the drawing, and then plug the back cord loop plug 13*b* into the front jack 16 of the transfer device 15, after which she will dial the person called at the remote station through an outgoing trunk line through a second loop cord, loop cord 14, for example, and then plug the back plug 14*b* into the back jack 23 of the transfer device. If normal battery polarity is present in both the incoming and outgoing trunk lines, positive (+) polarity will appear at the ring contact arms 16*a* and 20*a* associated, respectively, with the incoming and outgoing trunk lines. If, under such conditions, the switches 17 and 21 are both thrown to the right, a direct current circuit will be established through the diode 28 in one leg of the talking circuit to energize the supervisory lamp 25 in the other leg of the talking circuit. This circuit can be traced from positive battery through conductors 16*c* and 24 to one terminal of the supervisory lamp 25, thence, from the other terminal of said lamp, through conductors 26, 22 and 20*d* to negative battery of the outgoing trunk line, thence, from positive battery of the outgoing trunk line, through conductors 20*c*, 23 and 29 to the negative terminal of the diode 28, thence, from the positive terminal of said diode, through conductors 27 and 16*d* to negative battery associated with the incoming trunk line. The lighting of the supervisory lamp will thus serve as an indication that normal polarity is present in both trunk lines and that a talking circuit has been completed. If either or both of the incoming and outgoing trunk lines are reversed in polarity, this can be corrected for by throwing either or both of the switches 17 and 21 to the left, the switch 17 being operative to reverse connection to the incoming trunk line jack 16, and the switch 21 being operative to reverse connection to the outgoing trunk line jack 20. It will thus be apparent that it is a simple matter for the operator, in instances where non-lighting of the lamp 25 indicates reverse polarity in either or both of the incoming and outgoing trunk lines through which a call is to be rerouted, to throw first one, then the other, if necessary, and finally the first one again if further necessary, to correct for any condition of reverse polarity as indicated by the non-lighting of the lamp. The supervisory lamp 25 will remain lighted until completion of the call and return of the handset at either the calling or called station to the telephone cradle, at which instant polarity reversal will be effected in the talking circuit in accordance with standard telephone circuitry operation. It is to be noted that the disconnect thus effected at either the called or calling station will break the talking circuit, freeing the associated trunk lines immediately for further use.

While there is described herein only one form in which my invention may conveniently be embodied in practice, it is to be understood that this form is presented by way of example only, and not in a limiting sense. My invention, in brief, comprises all the modifications and embodiments coming within the scope and spirit of the following claims.

What I claim as new and desire to secure by Letters Patent is:

1. A telephone switchboard call transfer device comprising, in combination, a first jack having a tip and ring contact arm pair, a second jack having a tip and ring contact arm pair, an electrical circuit interconnecting said first jack tip and ring contact arm pair and said second jack tip and ring contact arm pair for transmitting voice frequency electrical currents therebetween, said electrical circuit comprising means for indicating the relative polarities of connection of two individual direct current energized telephone circuits connected one each to said first and second jack contact arm pairs, and switch means in said electrical circuit for separately reversing the polarity of connection of each of said first and second jack tip and ring contact arm pairs with respect to said electrical circuit, said relative polarities indicating means comprising a supervisory lamp and a diode rectifier series, connected in said electrical circuit.

2. A telephone switchboard call transfer device as defined in claim 1 wherein said switch means comprises a pair of double-pole double-throw switches each having a pair of movable contact members and two pairs of fixed contact members, said fixed contact member pairs of each switch being cross-connected, said movable contact pairs of said switches being connected, one pair each, to said pairs of tip and ring contact pairs of said first and second jacks, said electrical circuit comprising a first circuit leg connected between one cross-connected pair of fixed contact members at each of said switches and a second circuit leg connected between the other cross-connected pair of fixed contact members at each of said switches.

References Cited

UNITED STATES PATENTS

| | | | |
|---|---|---|---|
| 2,952,744 | 9/1960 | Semon | 179—42 |
| 2,984,707 | 5/1961 | Semon | 179—42 |
| 3,096,404 | 7/1963 | Semon | 179—42 |

KATHLEEN H. CLAFFY, *Primary Examiner.*

A. H. GESS, *Assistant Examiner.*